United States Patent

Banucci et al.

[11] 4,073,773
[45] Feb. 14, 1978

[54] MELT POLYMERIZATION METHOD FOR MAKING POLYETHERIMIDES

[75] Inventors: Eugene G. Banucci, Scotia; Gary A. Mellinger, Ballston Lake, both of N.Y.

[73] Assignee: General Electric Company, Schenectady, N.Y.

[21] Appl. No.: 755,686

[22] Filed: Dec. 30, 1976

[51] Int. Cl.² .......................................... C08G 73/10
[52] U.S. Cl. .......................... 260/47 CP; 260/46.5 E; 260/49; 260/78 TF; 264/349
[58] Field of Search ................ 260/46.5 E, 47 CP, 49, 260/78 TF, 65; 264/349

[56] References Cited

U.S. PATENT DOCUMENTS

| | | | |
|---|---|---|---|
| 3,803,085 | 4/1974 | Takekoshi et al. | 260/46.5 E |
| 3,833,546 | 9/1974 | Takekoshi et al. | 260/47 CP |
| 4,011,198 | 3/1977 | Takekoshi et al. | 260/47 CP |

*Primary Examiner*—Lester L. Lee
*Attorney, Agent, or Firm*—Richard G. Jackson; Joseph T. Cohen; Jerome C. Squillaro

[57] ABSTRACT

An improved extrusion melt polymerization method for continuously making polyetherimides is disclosed wherein a mixture of an organic diamine and an aromatic bis(ether anhydride) is continuously fed through an inlet opening into a screw extruder having a second opening downstream from the inlet opening. The mixture is passed through a first extruder zone maintained at a low temperature to a zone where the mixture is melted and water of reaction is continuously removed through the second opening. A melt seal may be employed between the second opening and a third opening through which water of reaction may be removed under vacuum.

16 Claims, 2 Drawing Figures

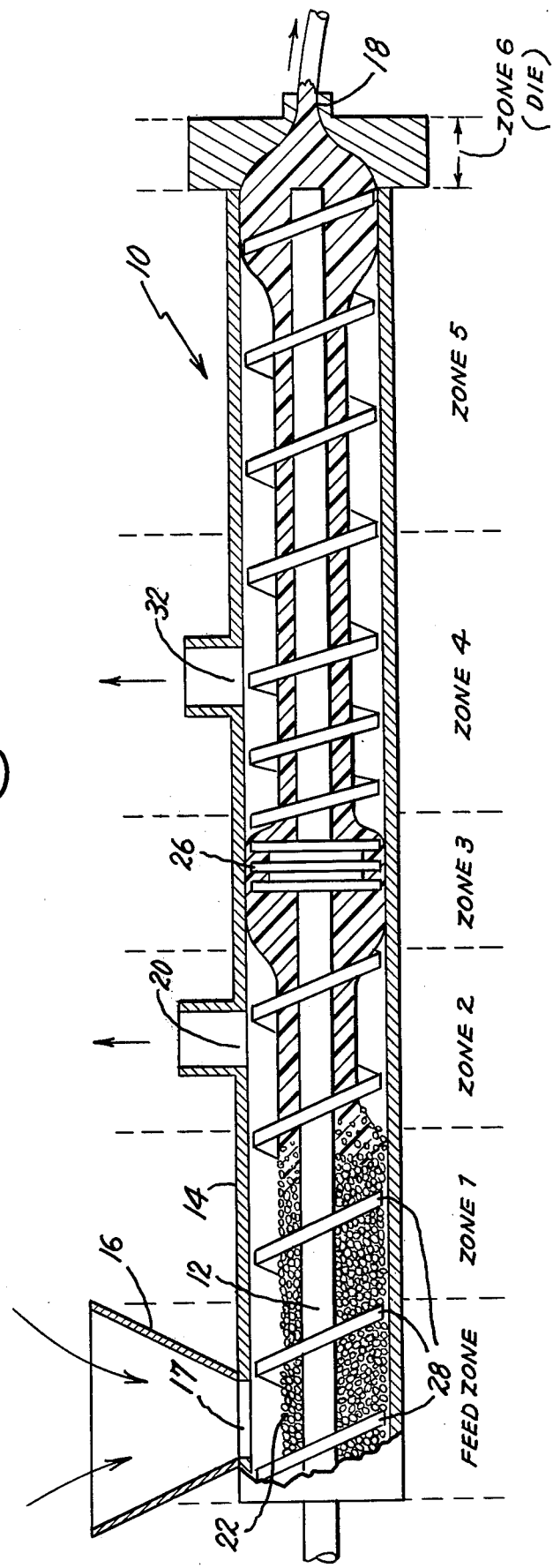
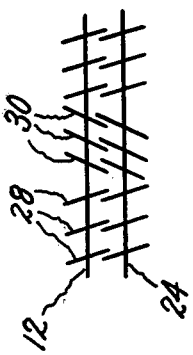

MELT POLYMERIZATION METHOD FOR MAKING POLYETHERIMIDES

The present invention relates to improvements in an extrusion melt polymerization process for making polyetherimides based on the reaction between aromatic bis(ether anhydride) compounds and organic diamines. The polymerization can be performed in a continuous manner.

U.S. Pat. No. 3,803,085 (Takekoshi and Kochanowski) discloses a melt polymerization method for making polyetherimides which comprises effecting the removal of water of reaction at temperatures up to 400° C from the melt of a mixture containing as essential ingredients organic diamine of the formula, $$H_2NR^1NH_2 \tag{I}$$

and aromatic bis(ether anhydride) of the formula,

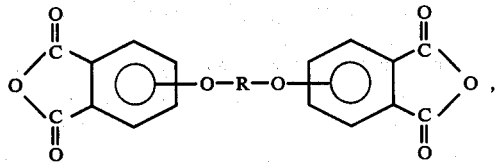

where R is a divalent aromatic organic radical having from 6–30 carbon atoms, $R^1$ is a divalent organic radical selected from R radicals, alkylene radicals having from 2–20 carbon atoms, cycloalkylene radicals, and $C_{(2-8)}$ alkylene terminated polydiorganosiloxane radicals.

In U.S. Pat. No. 3,833,546 and in application Ser. No. 549,469 filed Feb. 13, 1975, now U.S. Pat. No. 4,011,198 and assigned to the assignee hereof, Takekoshi et al. disclose that the above melt polymerization can be performed in a continuous manner by an extrusion melt polymerization method wherein a reaction mixture containing as essential ingredients an organic diamine of Formula I and a bis(ether anhydride) of Formula II is continuously fed through an inlet opening into the barrel of a screw extruder maintained at melt polymerization temperatures and water of reaction is continuously vented from the extruder. The above-cited patents are incorporated herein by reference.

It has now been found by practice of the present invention that a number of improvements are provided in the above-described extrusion melt polymerization method. Better results effected by the improvements include substantial elimination of plugging of the extruder inlet opening, faster polymerization, and shorter extruder residence time.

Generally stated, in one aspect, the present invention provides an improvement in an extrusion melt polymerization method for making polyetherimides wherein a reaction mixture containing as essential ingredients an organic diamine of Formula I and an aromatic bis(ether anhydride) of Formula II is continuously fed through an inlet opening into a screw extruder having a barrel maintained at melt polymerization temperature and water of reaction is continuously vented from the extruder, the improvement comprising:

(A) using a screw extruder having a second opening through the extruder wall and having an outlet orifice, the second opening being in a second barrel zone intermediate the inlet opening and the orifice, the second barrel zone being maintained at melt polmerization temperature;

(B) continuously conveying the reaction mixture through a first barrel zone maintained at a temperature below the melting point of the lowest melting essential ingredient, the first barrel zone extending from the inlet opening to the second barrel zone; and (C) continuously venting water of reaction through the second opening while continuously feeding reaction mixture through the inlet opening.

Advantageously, the improvement further includes maintaining the first and second barrel zones only partially filled with the reaction mixture.

Practice of the present invention will become more apparent from the following detailed description taken with the accompanying drawing.

In the drawing:

FIG. 1 is an elevation view partly in section, illustrating a screw extruder in which the improved method of this invention may be carried out; and FIG. 2 is a schematic plan view of corotatable intermeshing screws employed in the extruder in a preferred embodiment of the invention.

Referring now to the drawing, FIG. 1 illustrates screw extruder 10 having at least one screw 12 mounted rotatably within barrel 14 which is provided with hopper 16 above inlet opening 17 for continuously feeding a reaction mixture containing as essential ingredients an organic diamine of Formula I and an aromatic bis(ether anhydride) of Formula II into the extruder. Heating and cooling means (not shown) are provided along barrel 14 for controlling the temperature of the reaction mixture being advanced through the extruder. The extruder is provided near one end with a die having outlet orifice 18 and second opening 20 intermediate the inlet opening 17 and the orifice. The second opening extends through the extruder wall or barrel 14 and provides a means for removing volatile matter, e.g. water of reaction, from the barrel cavity.

For simplicity of description, the extruder is illustrated as including a plurality of longitudinal barrel zones, labelled Zone 1, Zone 2, Zone 3, Zone 4, etc. in FIG. 1. These zones are desirably adapted for individual temperature control, as will be made more apparent below.

In carrying out the improved method of this invention, the reaction mixture 22 is continuously fed through the inlet opening 17 into the barrel and continuously conveyed by the rotating screw through a first zone (Zone 1) which is maintained at a temperature below the melting point of the lowest melting essential ingredient, i.e. the barrel in the first zone is maintained at a low temperature, preferably below 50° C, e.g. about 45° C. The second barrel zone (Zone 2), which includes the second opening 20, is maintained at a melt polymerization temperature of the polyetherimide being formed. A substantial amount of water of reaction is formed in the second zone and is continuously vented out through opening 20, which is critical for substantial elimination of plugging of the extruder inlet opening and resulting extended operation uninterrupted by shut-downs necessitated by plugged inlets.

Advantageously, barrel Zone 2 is maintained only partially filled with the reaction mixture, as shown. Partial filling of the barrel in the first zone which is maintained at melt polymerization temperature (Zone 2) aids in increasing the rate and extent of polymerization by facilitating release of the water of reaction.

Partial filling is advantageously effected by employing in the extruder two or more generally parallel screws, which may be intermeshing or non-intermeshing and co-rotating or counter-rotating. Preferably, two or more intermeshing screws are employed. A pair of intermeshing screws is schematically illustrated by screws 12 and 24 in FIG. 2.

The extruder desirably includes a third zone, illustrated by Zone 3, wherein the barrel is maintained substantially filled and sealed with the reaction mixture. Such filling and sealing can be effected by providing a restriction or melt-sealing element on the screw, as illustrated by kneading block 26 in FIG. 1. Another means for effecting such filling and sealing is a screw having first direction flights 28 in nonfilled zones and opposite direction flights 30 (FIG. 2) in a zone to be filled and sealed. The first direction flights may be, for example, right hand screw flights with the opposite direction flights being, for example, left hand screw flights.

The extruder may further have opening 32 through the extruder wall in a fourth barrel zone (Zone 4 in FIG. 1). This opening is preferably connected to a source of vacuum for continuously withdrawing additional water of reaction from the reaction mixture downstream from the melt sealed section (Zone 3). The melt seal serves to preclude air from entering the extruder through opening 20 when a vacuum is applied at opening 32. Typically, Zones 3, 4 and 5 are maintained at melt polymerization temperatures of from about 250° up to 400° C, preferably from about 275° to about 375° C. The reaction mixture in these zones typically contains highly viscous high molecular weight polymer, from which water of reaction is somewhat difficult to remove. The cooperative effect of the application of vacuum through opening 32 and the melt seal in Zone 3 aids in removing additional water of reaction and results typically in polyetherimide products which are substantially free of bubbles.

The die (Zone 6) may be operated at a temperature from above the glass transition temperature of the polymer to below the polymer decomposition temperature, and preferably from about 280° to about 320° C.

Extrusion melt polymerizations have been carried out continuously for up to 2 hours using the present improved method. The residence time in the extruder can be quite low, for example 4.5 minutes.

Radicals included by R are, for example, aromatic hydrocarbon radicals and halogenated aromatic hydrocarbon radicals, for example, phenylene, tolylene, chlorophenylene, naphthalene, etc., and radicals included by the formula, $$-R^2-(Q)_a-R^2-,$$

where $R^2$ is a divalent aromatic radical having from 6-13 carbon atoms selected from hydrocarbon radicals and halogenated hydrocarbon radicals, and Q is a divalent organo radical selected from

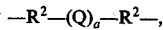

where $a$ is 0 or 1, $y$ is an integer having a value of from 1-5 inclusive, and $R^3$ is a monovalent hydrocarbon radical selected from methyl, phenyl, etc.

Radicals included by $R^1$ are, for example,

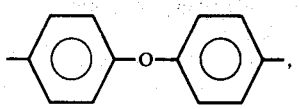

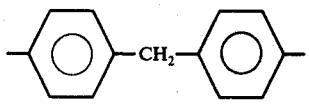 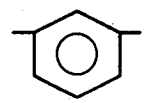

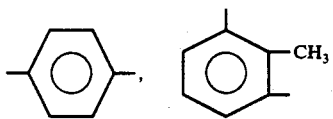

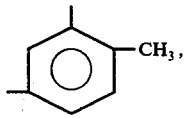

etc.; alkylene radicals such as hexamethylene, etc., cyclohexylene, etc.

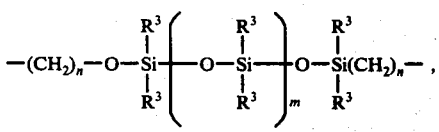

where $R^3$ is as defined above, $m$ is a whole number equal to from 0 to 100 inclusive, and $n$ is 2-8 inclusive.

Included by the organic dianhydrides of formula II are compounds such as

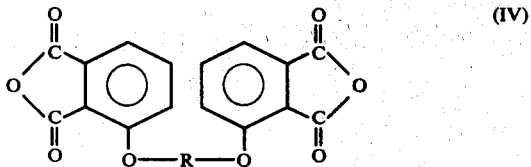 (IV)

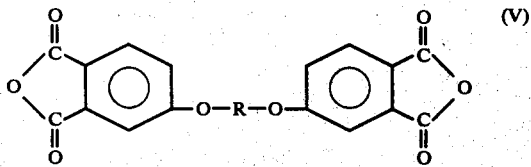 (V)

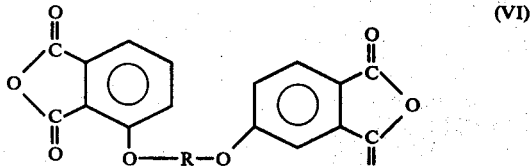 (VI)

where R is defined above. A preferred form of R is,

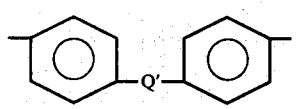

where Q' is selected from

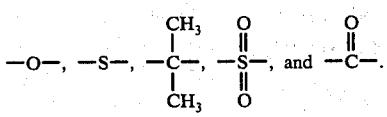

Aromatic bis(ether anhydride)s of formula II include, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; etc.,
and mixtures of such bis(ether anhydride)s.

Additional aromatic bis(ether anhydride)s also included by formula II are shown by Koton, M. M.; Florinski, F. S.; Bessonov, M. I.; Rudakov, A. P. (Institute of Heteroorganic Compounds, Academy of Sciences, USSR) USSR 257,010, Nov. 11, 1969, Appl. May 03, 1967, and by M. M. Koton, F. S. Florinski, Zh Org. Khin 4 (5) 774 (1968).

Bis(etheranhydride)s preferred herein are:
2,2-bis[4-(2,3-dicarboxyphenoxy)phenyl]propane dianhydride;
2,2-bis[4-(3,4-dicarboxyphenoxy)phenyl]propane dianhydride;
4-(2,3-dicarboxyphenoxy)-4'-(3,4-dicarboxyphenoxy)diphenyl-2,2-propane dianhydride; and
mixtures thereof.

Some of the aromatic bis(etheranhydride) compounds of formula II are shown in U.S. Pat. No. 3,972,902 (Heath and Wirth).

Included by the organic diamines of formula I are for example, m-phenylenediamine;
p-phenylenediamine;
4,4'-diaminodiphenylpropane;
4,4'-diaminodiphenylmethane (4,4'-methylenedianiline);
benzidine;
4,4'-diaminodiphenyl sulfide;
4,4'-diaminodiphenyl sulfone;
4,4'-diaminodiphenyl ether (4,4'-oxydianiline);
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.;
and mixtures of such diamines.

Organic diamines preferred herein are m-phenylenediamine; 4,4'-methylenedianiline; 4,4'-oxydianiline; and mixtures thereof.

Substantially equal molar amounts of the organic diamine and the aromatic bis(ether anhydride) compound provide optimum results. Effective results can be achieved with 0.5 to 2.0 mole of organic diamine, per mole of aromatic bis(ether anhydride). Monofunctional organic amines such as aniline, or organic anhydrides such as phthalic anhydride and maleic anhydride provide molecular weight control. Low molecular weight polyetherimide can be employed to form copolymers. From 0.1 to 50 mole percent of comonomers based on the total moles of reactants can be employed.

Polyetherimide having from 2 to 500 and preferably 10 to 50 average repeating units can be formed having an intrinsic viscosity in dimethylformamide at 25° C of from 0.1 to 1.5. These polyetherimides consist essentially of the following chemically combined units,

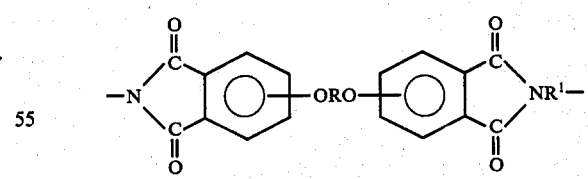

where R and R[1] are as previously defined. These polymers can be blended with various fillers such as silica fillers, glass fibers, carbon whiskers, perlite, etc. The resulting filled compositions can have a proportion of from about 1 part to 70 parts of filler per hundred parts of polyetherimide. The blending of the filler with the polyetherimide can be achieved by adding the filler prior to forming the melt or directly to the melt. Stirring can be effected with a standard agitating means to facilitate blending the ingredients.

In order that those skilled in the art will be better able to practice the invention, the following examples are given by way of illustration and not by way of limitation. All parts are by weight unless indicated otherwise.

EXAMPLE 1

Approximately one pound of a ball-milled powder mixture of 2,2-bis[4-(3,4-dicarboxyphenoxy)-phenyl]-propane dianhydride (312.2 grams, 0.6 mole) (4-BPADA) and 4,4'-methylenedianiline (119 grams, 0.6 mole) (MDA) was continuously fed through an inlet opening of a Werner-Pfleiderer twin-screw extruder into a first barrel zone maintained at 50° C by circulating cooling water. The screws were continuously rotated at 300 revolutions per minute. The reaction mixture was continuously conveyed through the cooled first zone to an adjacent second barrel zone maintained at 205° C and having an opening in the upper portion of the wall. A copious amount of water of reaction was continuously evolved in the second zone and continuously passed out through the opening provided in the second zone while the feed was continuously being added through the inlet opening. The reaction mixture was continuously passed through two additional heated zones (downstream from the second zone) maintained at 240° C. A polyetherimide product was continuously extruded through an outlet orifice provided near an end of the extruder. Imide content of the polyetherimide was found to be greater than 99%. The polymer had an intrinsic viscosity in chloroform of 0.55 dl. per gram at 25° C.

The above polyetherimide can be molded at 275° C and a pressure of 5,000–10,000 pounds per square inch to form a finished part.

EXAMPLE 2

Example 1 was repeated except that the powdered reaction mixture being continuously fed into the extruder included 15 percent by weight of CKM-2103 phenolic resin (a Union Carbide oil-soluble novolac resin prepared from a para-tertiary-butylphenol and formaldehyde) and the zones downstream from the second zone were maintained at 215° C.

The resulting polyetherimide-phenolic resin extrudate blend had an intrinsic viscosity in chloroform of 0.439 dl. per gram at 25° C.

The extrudate blend can be pulverized and used as a powder coating for metal substrates.

EXAMPLE 3

Example 1 was repeated except that the molar ratio of the 4-BPADA to the MDA was 3:2. The resulting light yellow polyetherimide extrudate had an imide content of greater than 99% and an intrinsic viscosity in chloroform of 0.12 dl. per gram at 25° C.

EXAMPLE 4

Example 1 was repeated except that the molar ratio of the MDA to the 4-BPADA was 3:2. The resulting clear dark brown polyetherimide extrudate had an intrinsic viscoisty in chloroform of 0.14 dl. per gram at 25° C.

EXAMPLE 5

Approximately nine pounds of a powder monomer mixture containing 0.97 mole of 4-BPADA, 1.0 mole of m-phenylenediamine, and 0.06 mole of phthalic anhydride was continuously fed at a rate of 8 to 12 grams per minute through the feed inlet of a Werner-Pfleiderer twin-screw extruder substantially as illustrated in FIG. 1 of the appended drawing. Zone 1 was maintained at 45° C and Zone 2 was maintained at 250° C. The temperature of Zone 3, 4, 5, and 6 (the die) was maintained at 320° C. The two intermeshing screws were run at 100 revolutions per minute. Water of reaction was continuously vented through the opening in Zone 2. The continuously extruded polyetherimide extrudate was air cooled and continuously pelletized. The intrinsic viscosity of the polyetherimide in chloroform was 0.51 dl. per gram at 25° C.

It is understood that the foregoing detailed description is given merely by way of illustration and that many variations may be made therein without departing from the spirit or scope of the present invention.

What is claimed is:

1. In an extrusion melt polymerization method for making polyetherimides wherein a reaction mixture containing as essential ingredients (I) an organic diamine of the formula, $$H_2NR^1NH_2$$

and (II) an aromatic bis(ether anhydride) of the formula,

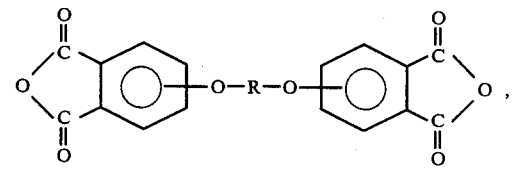

and (I) is present in an amount of 0.5 to 2.0 moles per mole of (II), is continuously fed through an inlet opening into a screw extruder having a barrel maintained at melt polymerization temperatures and water of reaction is continuously vented from the extruder, where R is a divalent aromatic organic radical having from 6 to 30 carbon atoms, $R^1$ is a divalent organic radical selected from the group consisting of said R radicals, alkylene radicals having from 2 to about 20 carbon atoms, cycloalkylene radicals, and $C_{(2-8)}$ alkylene terminated polydiorganosiloxane radicals, the improvement comprising:
 (A) using a screw extruder having a second opening through the extruder wall and having an outlet orifice, said second opening being in a second barrel zone intermediate said inlet opening and said orifice, said second barrel zone being maintained at melt polymerization temperature;
 (B) continuously conveying the reaction mixture through a first barrel zone maintained at a temperature below the melting point of the lowest melting essential ingredient, said first barrel zone extending from said inlet opening to said second barrel zone; and
 (C) continuously venting water of reaction at a temperature of up to 400° C through said second opening while continuously feeding reaction mixture through said inlet opening.

2. The method of claim 1, further including maintaining the first and second barrel zones only partially filled with the reaction mixture.

3. The method of claim 2, wherein the extruder includes a third barrel zone intermediate said second zone and said outlet orifice, and further including maintaining said third barrel zone substantially filled and sealed with the reaction mixture.

4. The method of claim 3, wherein the extruder has a third opening through the extruder wall, said third opening being in a fourth barrel zone intermediate said third zone and said orifice, and continuously venting water of reaction through said third opening under applied vacuum.

5. The method of claim 1, wherein the extruder includes two intermeshing screws.

6. The method of claim 2, wherein the extruder includes two intermeshing screws.

7. The method of claim 4, wherein the extruder includes a screw having first direction flights in said first, second and fourth zones and having second direction flights in said third zone, said first direction being opposite and second direction.

8. The method of claim 4, wherein the extruder includes a screw having a kneading block in said third zone.

9. The method of claim 1, where the aromatic bis(ether anhydride) has the formula,

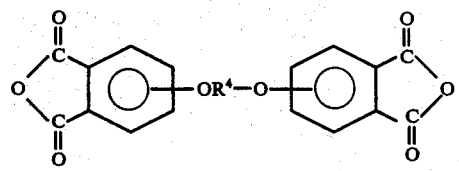

where R⁴ is

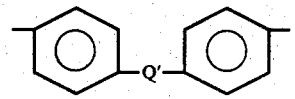

and Q' is a member selected from the class consisting of

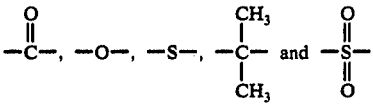

10. The method of claim 9, where the aromatic bis(ether anhydride) has the formula,

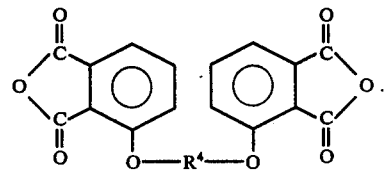

11. The method of claim 9, where the aromatic bis(ether anhydride) has the formula,

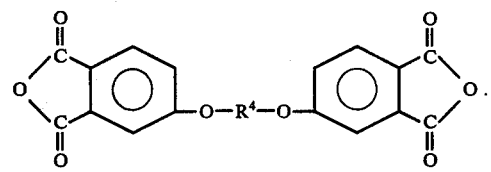

12. The method of claim 9, where the aromatic bis(ether anhydride has the formula,

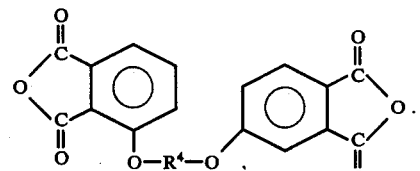

13. The method of claim 1, wherein the dianhydride is 2,2-bis[4-(3,4-dicarboxyphenoxy)phenyl]-propane dianhydride and the diamine is m-phenylenediamine.

14. The method of claim 1, wherein the dianhydride is 2,2-bis[4-(3,4-dicarboxyphenoxy)phenyl]propane dianhydride and the diamine is 4,4'-methylenedianiline.

15. The metho of claim 1, wherein the dianhydride is 2,2-bis[4-(2,3-dicarboxyphenoxy)phenyl]propane dianhydride and the diamine is m-phenylenediamine.

16. The method of claim 1, wherein the dianhydride is 2,2-bis[4-(2,3-dicarboxyphenoxy)phenyl]propane dianhydride and the diamine is 4,4'-methylenedianiline.

* * * * *